United States Patent Office 3,489,791
Patented Jan. 13, 1970

---

3,489,791
MONO AND DI LOWER ALKOXYCARBONYL SUBSTITUTED 10,11 - DIHYDRO - 5,10,11-METHENO - 5H - DIBENZO [a,d] CYCLOHEPTENES
Engelbert Ciganek, Chadds Ford, Pa., assignor to E. I. du Pont de Nemours and Company, Wilmington, Del., a corporation of Delaware
No Drawing. Filed Apr. 13, 1966, Ser. No. 542,237
Int. Cl. C07c *69/74, 121/48;* C08f *45/40*
U.S. Cl. 260—469                           4 Claims

ABSTRACT OF THE DISCLOSURE 10,11-dihydro - 5,10,11 - metheno-5H-dibenzo[a,d]cycloheptenes having various substituents in the 5-, 10-, 12-, 5,10- or 10,12-positions are claimed. These compounds which are useful as plasticizers for polyvinyl chloride are prepared by the ultraviolet light irradiation of 9-, 11-, 9,10- or 11,12-substituted 9,10 - dihydro-9,10-ethenoanthracenes.

BACKGROUND OF THE INVENTION

This invention relates to a substituted polycyclic compounds and to the process for their preparation.

DESCRIPTION OF THE INVENTION

This invention is directed to mono- and disubstituted 10,11-dihydro - 5,10,11 - metheno-5H-dibenzo[a,d]cycloheptenes of the formulae

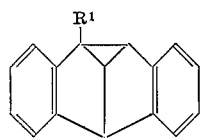
(I)

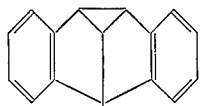
(II)

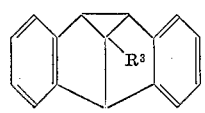
III

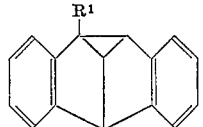
IV

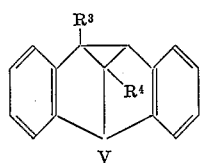
V wherein $R^1$ and $R^2$ are selected from cyano, amino, lower alkoxycarbonyl, carboxy and lower perfluoroalkyl; and $R^3$ and $R^4$ are selected from cyano, lower alkoxycarbonyl, carboxy and lower perfluoroalkyl.

Examples of lower alkoxycarbonyl substituents include: methoxycarbonyl, ethoxycarbonyl, n-propoxycarbonyl and n-butoxycarbonyl; said substituents are also called carbomethoxy, carbethoxy, carbo-n-propoxy and carbo-n-butoxy, respectively. Examples of lower perfluoroalkyl substituents include: trifluoromethyl, pentafluoroethyl, n-heptafluoropropyl, iso-heptafluoropropyl and n-nonafluorobutyl.

The numbering of the ring system 10,11-dihydro-5,10,11-metheno-5H-dibenzo[a,d]cycloheptene is

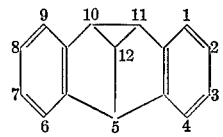

This system is also called 4b,8b,8c,8d-tetrahydrodibenzo [a,f]cyclopropa[c,d]pentalene.

The compounds of this invention are: The 5-, 10-, and 12-monosubstituted and 5,10- and 10,12-disubstituted 10,11 - dihydro - 5,10,11 - metheno-5H-dibenzo[a,d]cycloheptenes.

The process of this invention comprises irradiating with actinic radiation, mono- and disubstituted 9,10-dihydro-9,10-ethenoanthracenes of the formulae

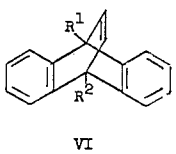
VI

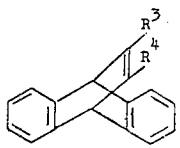
VII

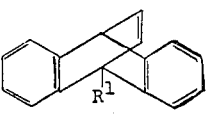
VIII

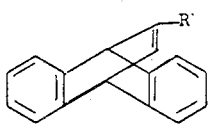
IX wherein $R^1$, $R^2$, $R^3$ and $R^4$ are as defined above.

Irradiation of 9,10-disubstiuted 9,10-ethenoanthracenes (VI) yields 5,10 - disubstituted 10,11-dihydro-5,10,11-metheno-5H-dibenzo[a,d]cycloheptenes (IV). Irradiation of 11,12-disubstituted 9,10-ethenoanthracenes (VII) yields 10,12 - dihydro-5,10,11-metheno-5H-dibenzo[a,d] cycloheptenes (V).

Irradiation of the 9-monosubstituted 9,10-dihydro-9,10-ethenoanthracenes (VIII) yields a mixture of 5- and 10-monosubstituted 10,11-dihydro-5,10,11-metheno - 5H - dibenzo[a,d]cycloheptenes (I and II) whereas irradiation of 11-monosubstituted 9,10-dihydro-9,10-ethenoanthracenes (IX) yields 12-monosubstituted 10,11-dihydro-5,10,11-metheno-5H-dibenzo[a,d]cycloheptenes (III).

In the process of this invention actinic radiation such as ultraviolet light of wavelengths in the range from about 150–4000 A. can be employed. Ultraviolet light having shorter wavelengths tends to promote side reactions along with producing the compounds of the invention. The use of ultraviolet light having wavelengths above 1500 A. and particularly in the range of 2000–3500 A. is therefore preferred in the process of this invention. Irradiation is conducted at an intensity and for a sufficient length of time to effect the formation of at least some, and preferably an economically recoverable amount of the compounds of this invention. Times of about 10–72 hours and longer can be used. The actual intensities and times used can be varied widely depending on the equipment used, the wavelength of the radiation, concentration of the reactants and concentration of photosensitizer, if a photosensitizer is used.

Ultraviolet light used as the actinic radiation for the process of this invention emanates from commercially available ultraviolet light sources.

The process of this invention can be carried out by irradiating the compounds VI–IX neat, that is undiluted. The process is operable in the solid phase. The process is also operable in liquid phase and gas phase, for example by operating at elevated temperatures or in solution. Aprotic solvents which can be used to prepare solutions include: ethers, for example diethylether, tetrahydrofuran and the like, hydrocarbons such as hexane, cyclohexane, benzene and the like and halogenated hydrocarbons such as chloroform, carbon tetrachloride and the like. Protic solvents such as alcohols are operable but aprotic solvents are preferred.

The process of this invention is promoted by a photosensitizer, for example acetone. The use of a photosensitizer is accordingly preferred in the process of this invention.

Temperatures and pressures are not critical in the process of this invention. Room temperatures and pressures are operable, and temperatures and pressures both above and below these can be used. Temperatures in excess of the decomposition temperature of the reactants or products should be avoided.

The reactor for carrying out the process of this invention can be constructed of any material which is chemically inert to the reactants and products when the source of the actinic radiation is within the reactor. For example, glass-lined steel reactors, stainless steel reactors and the like. If an external actinic radiation source is used, the reactor must permit some reasonable transmission of the said radiation for the ultraviolet light. When the actinic radiation is ultraviolet light, quartz or Pyrex® glass vessels can be used.

Isolation and separation of the products is accomplished by conventional organic synthetic techniques. Generally, crystallization techniques can be used to isolate the product. Chromatographic techniques can be used to separate the isomeric products.

Monosubstituted 9,10-dihydro-9,10-ethenoanthracenes VIII and IX are prepared by reacting cis-1,2-dichloroethylene with 9-substituted anthracene followed by reductive dechlorogenation using a zinc-copper couple as described in Examples 5 and 6 and by reaction of a monosubstituted acetylene with anthracene as described in Example 4, respectively.

11,12-disubstituted 9,10-dihydro-9,10-ethenoanthracenes VI are prepared by the reaction of disubstituted acetylenes with anthracene as described in Example 1. 9,10-disubstituted-9,10-dihydro-9,10-ethenoanthracenes VII are prepared by the reaction of cis-1,2-dichloroethylene with 9,10-disubstituted anthracenes followed by dechlorination similar to the process described in Examples 5 and 6.

5,10-dicyano-10,11-dihydro-5,10,11-metheno-5H-dibenzo[a,d]cycloheptene and 5,10-dicarbomethoxy-10,11-dihydro-5,10,11-metheno-5H-dibenzo[a,d]cycloheptene can be produced by irradiating with ultraviolet light of 2000–3500 A. 9,10-dicyano-9,10-dihydro-9,10-ethenoanthracene and 9,10-dicarbomethoxy-9,10-dihydro-9,10-ethenoanthracene, respectively.

The following examples further illustrate this invention. In the examples, parts are by weight unless otherwise specified.

EXAMPLE 1

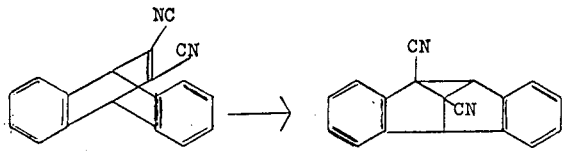

A solution of 3.082 g. of 11,12-dicyano-9,10-dihydro-9,10-ethenoanthracene in 300 ml. of benzene, contained in an internally cooled Pyrex® vessel, was irradiated with ultraviolet light in a Srinivasan-Griffin photochemical reactor (3500 A. lamps) for 64 hours. Removal of the solvent and crystallization from ethyl acetate gave 1.618 g. of 10,12-dicyano-10,11-dihydro-5,10,11-methano-5H-dibenzo[a,d]-cycloheptene. Removal of the solvent from the mother liquor and crystallization of the residue from ethanol-acetonitrile mixture gave an additional 834 mg. of product. Combined yield: 2.452 g. (80%). An analytical sample, prepared by crystallization from ethyl acetate, had M.P. 179–180° C. N.M.R. spectrum (in perdeuterioacetone): multiplet at $\tau$2.8–3.3 (8H) and singlets at $\tau$4.86 (1H) and 5.44 (1H). Ultraviolet spectrum:

$\lambda_{max.}^{MeCN}$ 279 m$\mu$ ($\epsilon$ 650), 271 m$\mu$ ($\epsilon$ 890) and 221 m$\mu$ ($\epsilon$ 28,000)

*Analysis.*—Calcd. for $C_{18}H_{10}N_2$: C, 85.02; H, 3.96; N, 11.02. Found: C, 85.37; H, 3.82; N, 10.83.

EXAMPLE 2

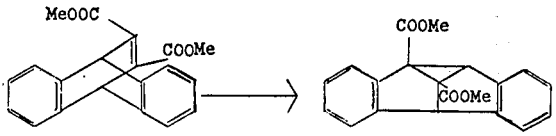

A solution of 75.02 g. of 9,10-dihydro-11,12-dimethoxycarbonyl-9,10-ethenoanthracene in 750 ml. of acetone was irradiated for 157 hours with ultraviolet light from a Philips HPK 125 high pressure mercury lamp. Removal of the solvent gave 76.5 g. of a viscous yellow oil. It was dissolved in 150 ml. of toluene and the crystals were collected after standing at Dry Ice temperature for 16 hours. The product weighed 43.7 g. A second crop of 25.2 g. was obtained by evaporating the mother liquor to dryness, dissolving the residue in 50 ml. of methanol and collecting the crystals formed after standing at room temperature for 16 hours. Combined yield of 10,11-dihydro-10,12-dimethoxycarbonyl-5,10,11-methano-5H-dibenzo[a,d]cycloheptene: 71.9 g. (96%). An analytical sample, prepared by crystallization from methanol, had M.P. 98–99° C. N.M.R. spectrum (in CDCl$_3$): multiplet at $\tau$2.6 to 3.1 (8H) and singlets at $\tau$4.97 (1H), 5.51 (1H), 6.17 (3H) and 6.32 (3H). Ultraviolet spectrum:

$\lambda_{max.}^{MeCN}$ 279 m$\mu$ ($\epsilon$ 1200), 271 m$\mu$ ($\epsilon$ 1500), 265 m$\mu$ ($\epsilon$ 1400) and 217 m$\mu$ (shoulder, $\epsilon$ 25,000)

*Analysis.*—Calcd. for $C_{20}H_{16}O_4$: C, 74.99; H, 5.03. Found: C, 74.98; H, 5.32.

The same product was obtained using either cyclohexane or benzene as the solvent and two Westinghouse RS sunlamps as light sources.

EXAMPLE 3

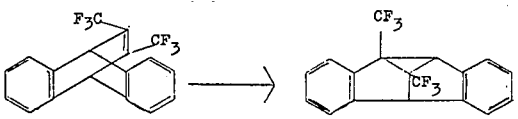

A solution of 4.68 g. of 11,12-bis(trifluoromethyl)-9,10-dihydro-9,10-ethenoanthracene in a mixture of 300 ml. of benzene and 5 ml. of acetone was irradiated with ultraviolet light from a Philips HPK 125 high pressure mercury lamp for 21 hours. Removal of the solvent and crystallization of the residue from 10 ml. of 70% aqueous ethanol gave 3.45 g. (74% yield) of 10,12-bis(trifluoromethyl)-10,11-dihydro-5,10,11-methano-5H-dibenzo[a,d] cycloheptene. An analytical sample (ethanol) had M.P. 81.5–82.5° C. Proton N.M.R. spectrum (in CdCl$_3$): multiplet at $\tau$2.5 to 3.2 (8H) and singlets at $\tau$5.10 (1H), and 5.86 (1H). Ultraviolet spectrum:

$\lambda_{max.}^{MeCN}$ 278 m$\mu$ ($\epsilon$ 800), 270 m$\mu$ ($\epsilon$ 960), 264 m$\mu$ ($\epsilon$ 780) and 215 m$\mu$ ($\epsilon$ 28,000)

*Analysis.*—Calcd. for $C_{18}H_{10}F_6$: C, 63.53; H, 2.96; F, 33.50. Found: C, 63.52; H, 3.10; F, 33.47.

EXAMPLE 4

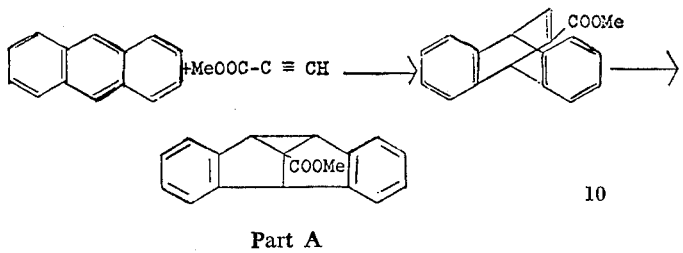

Part A

A deoxygenated mixture of 10 g. of anthracene and 25 g. of methyl propiolate, contained in a Carius tube, was heated to 200° C. for 12 hours. The tube was rinsed out with methylene chloride, the solvent was removed, and the residue was crystallized from 50 ml. of toluene giving 6.81 g. of 9,10-dihydro-11-methoxycarbonyl-9,10-ethenoanthracene. A further 1.79 g. of product was obtained by concentrating the mother liquor to dryness and crystallizing the residue from 30 ml. of acetonitrile. Combined yield: 58%. An analytical sample, M.P. 179.5–180.5° C., was prepared by crystallization from acetonitrile. N.M.R. spectrum (in $CDCl_3$): doublet (J=6.1 c.p.s.) split into doublets (J=1.9 c.p.s.), centered at $\tau$2.13 (1H), multiplet at $\tau$2.5 to 3.2 (8H): doublet (J=1.9 c.p.s.) at $\tau$4.33 (1H), doublet (J=6.1 c.p.s.) at $\tau$4.80 (1H) and singlet at $\tau$6.30 (3H). Ultraviolet spectrum:

$\lambda_{max.}^{MeCN}$ 278 m$\mu$ ($\epsilon$ 3100), 272 m$\mu$ ($\epsilon$ 2600) and 214 m$\mu$ ($\epsilon$ 42,000)

*Analysis.*—Calcd. for $C_{18}H_{14}O_2$: C, 82.42; H, 5.38. Found: C, 82.58; H, 5.43.

Part B

A deoxygenated solution of 6.03 g. of 9,10-dihydro-11-methoxycarbonyl-9,10-ethenoanthracene in 400 ml. of acetone, contained in an internally cooled Pyrex® vessel, was irradiated with ultraviolet light from a Philips HPK 125 high pressure mercury lamp for 14 hours. Removal of the solvent gave 6.037 g. of a pale yellow solid, the N.M.R. spectrum of which showed the presence of more than 95% of the 12-methoxycarbonyl isomer (see below). A small amount of the 10-isomer may have been present. Crystallization of 4.99 g. of the product from a mixture of 25 ml. of ethanol and 15 ml. of ethyl acetate gave 3.74 g. (75% yield) of 10,11-dihydro-12-methoxycarbonyl-5,10,11-metheno-5H-dibenzo-[a,d]cycloheptene, M.P. 169.5–170.5° C. N.M.R. spectrum (in $CDCl_3$): multiplet at $\tau$2.6 to 3.1 (8H) and singlets at $\tau$5.03 (1H), 6.23 (2H) and 6.32 (3H). Ultraviolet spectrum:

$\lambda_{max.}^{MeCN}$ 280 m$\mu$ ($\epsilon$ 1600); 272 m$\mu$ ($\epsilon$ 1900); 266 m$\mu$ ($\epsilon$ 1500); and 220 m$\mu$ ($\epsilon$ 27,000)

*Analysis.*—Calcd. for $C_{18}H_{14}O_2$: C, 82.42; H, 5.38. Found: C, 82.20; H, 5.42.

EXAMPLE 5

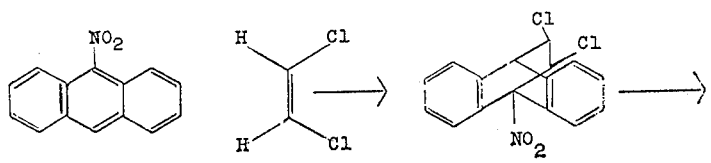

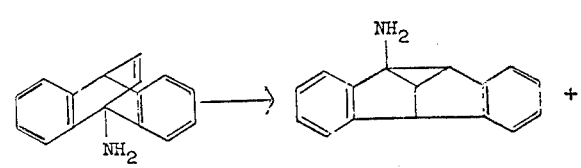

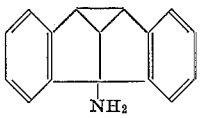

Part A

A mixture of 9.62 g. of 9-nitroanthracene and 35 ml. of cis-1,2-dichloroethylene, contained in a sealed Carius tube, was heated to 200° C. for 24 hours and then to 230° C. for 48 hours. The product was passed through 80 g. of magnesium fluorosilicate and eluted with 600 ml. of methylene chloride. Further purification by crystallization from toluene gave 8.08 g. of 11,12-dichloro-9,10-dihydro-9-nitro-9,10-ethanoanthracene, M.P. 186–188° C.

Part B

A zinc-copper couple was prepared by treating 15 g. of zinc dust with 400 ml. of a 2% aqueous solution of copper sulfate. It was washed with ethanol and added to a suspension of 6.188 g. of 11,12-dichloro-9,10-dihydro-9-nitro-9,10-ethanoanthracene in 200 ml. of ethanol. After heating under reflux for six hours, the mixture was filtered while hot, and the solids were washed with boiling ethanol. The combined filtrates were evaporated to dryness and the precipitate was treated with 10% aqueous hydrochloric acid. The residue was collected by filtration, washed with methylene chloride and water, and dried. The hydrochloride so obtained was suspended in water and treated with potassium hydroxide pellets. The mixture was extracted with ether, and the ether extracts were dried over potassium hydroxide. The removal of the solvent gave 3.027 g. of 9-amino-9,10-dihydro-9,10-ethenoanthracene, M.P. 146–149° C. after crystallization from ethanol. The N.M.R. spectrum showed a multiplet at $\tau$2.5–3.5 (8H), a doublet of doublets at $\tau$5.0 (1H) and a broad singlet at $\tau$7.8 (2H).

Part C

A deoxygenated solution of 716 mg. of 9-amino-9,10-dihydro 9,10-ethenoanthracene in 125 ml. of acetone in an internally cooled Pyrex® vessel was irradiated for 15 hours with ultraviolet light from a Philips HPK 125 high pressure mercury lamp. Removal of the solvent gave a mixture of the 5- and 10-amino-10,11-dihydro-5,10,11-metheno-5H-dibenzo[a,d]cycloheptenes having the following N.M.R. spectrum: multiplets at $\tau$2.3–3.3 (8H) and $\tau$5.8–7.1 (3H) and broad singlet at $\tau$5.5 (2H).

EXAMPLE 6

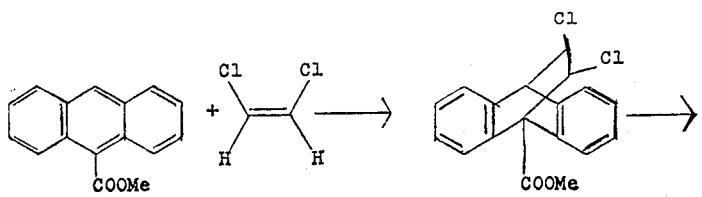

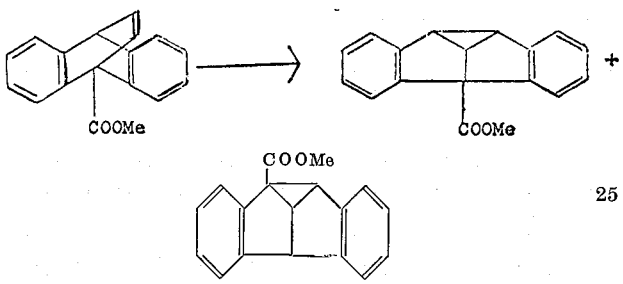

Part A

A mixture of 10.00 g. of 9-methoxycarbonylanthracene and 35 g. of cis-1,2-dichloroethylene, contained in a sealed Carious tube, was heated to 240° C. for 48 hours. Removal of the solvent and chromatography of the residue over 80 g. of magnesium fluorosiilcate gave 14.74 g. of a brown oil, eluted with 1000 ml. of methylene chloride. The product was dissolved in 80 ml. of boiling methanol. On cooling, 8.27 g. (59% yield) of cis-11,12-dichloro-9,10-dihydro-9-methoxycarbonyl-9,10 - ethanoanthracene was obtained. An analytical sample, prepared by crystallization from isopropyl alcohol, had a melting point of 161.5–162.5° C.

*Analysis.*—Calcd. for $C_{18}H_{14}Cl_2O_2$: C, 64.88; H, 4.24. Found: C, 63.26; H, 4.39.

Part B

A zinc-copper couple was prepared by treating 3.8 g. of zinc dust with three 10-ml. portions of 2% aqueous copper sulfate solution followed by washing with 50 ml. of ethanol. It was then added to a solution of 1.895 g. of cis-11,12-dichloro-9,10-dihydro-9 - methoxycarbonyl - 9,10-ethanoanthracene in 25 ml. of ethanol. After heating under reflux for six hours, the mixture was filtered while hot, and the solids were washed repeatedly with hot ethanol. The combined filtrates were evaporated to dryness. The residue obtained was dissolved in methylene chloride and washed with 3% aqueous hydrochloric acid, 5% aqueous sodium bicarbonate solution, and concentrated sodium chloride solution, and dried. Removal of the solvent and crystallization of the residue from isopropyl alcohol gave 1.238 g. (83%) of 9,10-dihydro-9-methoxycarbonyl-9,10-ethenoanthracene. An analytical sample, prepared by recrystallization from isopropyl alcohol had a melting point of 139–140° C. N.M.R. spectrum (in $CDCl_3$): multiplet at $\tau 2.5$–3.1 (10H); doublet (J=6 c.p.s.) split into doublets (J=1.5 c.p.s.), centered at $\tau 4.91$ (1H) and singlet at $\tau 5.94$ (3H). Ultraviolet spectrum:

$\lambda_{max.}^{MeCN}$ 278 m$\mu$($\epsilon$ 2500), 271 m$\mu$($\epsilon$ 1500), 263 m$\mu$ ($\epsilon$ 800), and 215 m$\mu$($\epsilon$ 38,000).

*Anaylsis.*—Calcd. for $C_{18}H_{14}O_2$: C, 82.42; H, 5.38. Found: C, 82.12; H, 5.62.

Part C

A deoxygenated solution of 1.047 g. of 9,10-dihydro-9-methoxycarbonyl-9,10-ethenoanthracene in 200 ml. of acetone, contained in an internally water-cooled Pyrex® vessel, was irradiated with ultraviolet light from a Philips HPK 125 high pressure mercury lamp for 16 hours. Removal of the solvent and chromatographic separation of the residue on a magnesium fluorosilicate column gave 955 mg. (91% yield) of a mixture of the 5- and 10-isomers of methoxycarbonyl-10,11-dihydro-5,10,11-metheno-5H - dihydro-5,10,11-metheno-5H - dibenzo[a,d]cycloheptene in the ratio of 67:33. The earlier fractions (benzene-n-hexane 7:3) contained the 5-isomer; the 10-isomer was eluted completely only with $CH_2Cl_2$-tetrahydrofuran 9:1.

The 5-isomer, after two crystallizations from methanol, had a melting point of 101–102° C. N.M.R. spectrum (in $CDCl_3$): multiplet at $\tau 2.4$ to 4.1 (8H); triplet (J=6.5 c.p.s.) centered at $\tau 5.96$ (1H); singlet at $\tau 6.20$ (3H) and doublet (J=6.5 c.p.s.) centered at $\tau 6.92$ (2H). Ultraviolet spectrum:

$\lambda_{max.}^{MeCN}$ 281 m$\mu$(shoulder, $\epsilon$ 1400), 273 m$\mu$($\epsilon$ 1900), and 215 m$\mu$(38,000).

*Analysis.*—Calcd. for $C_{19}H_{14}O_2$: C, 82.42; H, 5.38. Found: C, 82.02; H, 5.41.

The 10-isomer, after two crystallizations from isopropyl alcohol, had a melting point of 129–130° C. N.M.R. spectrum (in $CDCl_3$): multiplets at $\tau 2.1$ to 2.3 (1H) and 2.6 to 3.2 (7H); doublet (J=5 c.p.s.) centered at $\tau 5.50$ (1H); multiplet at $\tau 5.9$ to 6.1 (2H) and singlet at $\tau 6.23$ (3H). Ultraviolet spectrum:

$\lambda_{max.}^{MeCN}$ 280 m$\mu$($\epsilon$ 1400), 272 m$\mu$($\epsilon$ 2100), and 223 m$\mu$($\epsilon$ 27,000).

*Analysis.*—Calcd. for $C_{18}H_{14}O_2$: C, 82.42; H, 5.38. Found: C, 82.39; H, 5.39.

When 11,12-dicarboxyl-9,10-dihydro - 9,10 - ethenoanthracene, prepared by saponification of the dimethyl ester, is substituted for 10,12-dicyano-10,11-dihydro-9,10-ethenoanthracene in the procedure of Example 1, 10,12-dicarboxy-10,11-dihydro-5,10,11-metheno - 5H - dibenzo[a,d] cycloheptene can be obtained.

The products of this invention are compatible with the polyvinyl chloride resins and are useful as plasticizers therefor.

EXAMPLE 7

A solution of 2.067 g. of polyvinyl chloride (Geon 103 EP) in 20 ml. of tetrahydrofuran was divided into two equal parts, A and B. To A was added 0.5 g. of 10,11-dihydro-10,12-dimethoxycarbonyl-5,10,11-metheno - 5H-dibenzo[a,d]cycloheptene. Films were cast from the two solutions. The film from A was plasticized and was flexible and tough. The film from B was stiff and brittle.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. Compounds of the formulas

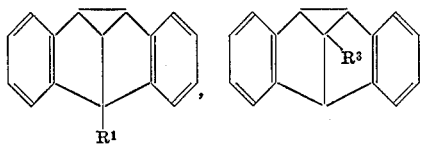

and

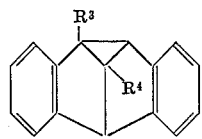

wherein
$R^1$, $R^3$ and $R^4$ are lower alkoxycarbonyl.

2. The compound of claim 1 wherein $R^3$ and $R^4$ are methoxycarbonyl; said compound being 10,12-dimethoxycarbonyl-10,11-dihydro-5,10,11-metheno-5H-dibenzo[a,d]cycloheptene.

3. The compound of claim 1 wherein $R^3$ is methoxycarbonyl; said compound being 12-methoxycarbonyl-10,11-dihydro - 5,10,11 - metheno-5H-dibenzo[a,d]cycloheptene.

4. The compound of claim 1 wherein $R^1$ is methoxycarbonyl; said compound being 5-methoxycarbonyl-10,11-dihydro - 5,10,11-metheno-5H-dibenzo[a,d]cycloheptene.

References Cited

UNITED STATES PATENTS 2,977,394    3/1961    Krespan et al.

OTHER REFERENCES

Emerson et al.: J. Am. Chem. Soc., vol. 87, pp. 131–133 (1965).

Zimmerman et al.: J. Am. Chem. Soc., vol. 88, pp. 183–184 (1966).

CHARLES B. PARKER, Primary Examiner

S. T. LAWRENCE III, Assistant Examiner

U.S. Cl. X.R.

204—158, 163; 260—31.2, 31.8, 32.4, 32.6, 33.8, 465, 471, 475, 515, 518, 578, 645, 646, 649, 696

PO-1050
(5/69)

UNITED STATES PATENT OFFICE
CERTIFICATE OF CORRECTION

Patent No. 3,489,791          Dated January 13, 1970

Inventor(s)    Engelbert Ciganek

It is certified that error appears in the above-identified patent and that said Letters Patent are hereby corrected as shown below:

Column 1, line 26, delete the word "a";

Column 2, formula IX, "-R " should be -- $-R^3$ --;

Column 4, lines 1, 36 and 66, correct the spelling of -- metheno --, each occurrence;

Column 7, line 33, correct the spelling of -- Carius --;

Column 8, line 32, delete the following: "hydro-5,10,11-metheno-5H-di"; line 38, "to 4.1" should be -- to 3.1 --; line 43, "215 mµ" should be -- 219 mµ --; line 44, "$C_{19}H_{14}O_2$" should be -- $C_{18}H_{14}O_2$ -- line 58, "-dicarboxyl-" should be -- -dicarboxy- --.

SIGNED AND
SEALED

AUG 4 - 1970

(SEAL)
Attest:

Edward M. Fletcher, Jr.
Attesting Officer

WILLIAM E. SCHUYLER, JR.
Commissioner of Patents